United States Patent

Cecchin et al.

[11] Patent Number: 5,286,564
[45] Date of Patent: * Feb. 15, 1994

[54] ELASTOPLASTIC POLYOLEFIN COMPOSITIONS

[75] Inventors: Giuliano Cecchin; Floriano Guglielmi; Anteo Pelliconi, all of Ferrara; Emanuele Burgin, Bologna, all of Italy

[73] Assignee: Himont Incorporated, Wilmington, Del.

[*] Notice: The portion of the term of this patent subsequent to May 18, 2010 has been disclaimed.

[21] Appl. No.: 734,390

[22] Filed: Jul. 23, 1991

[30] Foreign Application Priority Data

Aug. 1, 1990 [IT] Italy ............................... 21169 A/90

[51] Int. Cl.$^5$ ...................... C08L 23/10; C08L 23/16; C08F 297/08
[52] U.S. Cl. .................... 428/402; 525/240; 525/322; 525/323
[58] Field of Search ............. 525/240, 322, 323; 428/402

[56] References Cited

U.S. PATENT DOCUMENTS

| | | | |
|---|---|---|---|
| 3,957,919 | 5/1976 | Von Bodugen et al. | 525/211 |
| 4,128,606 | 12/1978 | Furutachi et al. | 525/322 |
| 4,316,966 | 2/1982 | Meneshima et al. | 525/240 |
| 4,368,280 | 1/1983 | Yai et al. | 525/240 |
| 4,547,552 | 10/1985 | Toyota et al. | 525/247 |
| 4,634,735 | 1/1987 | Thiersault et al. | 525/240 |
| 4,882,380 | 11/1989 | Ficker et al. | 525/323 |
| 5,023,300 | 6/1991 | Huff et al. | 525/322 |
| 5,212,246 | 5/1993 | Ogale | 525/240 |

FOREIGN PATENT DOCUMENTS 256724 2/1988 European Pat. Off. .
0400333 12/1990 European Pat. Off. .

*Primary Examiner*—Carman J. Seccuro, Jr.

[57] ABSTRACT

Elastoplastic polyolefin compositions endowed with high flexibility, comprising:

A) 10–50 parts by weight of a homopolymer of propylene with isotactic index greater than 80, or a copolymer of propylene with ethylene, another α-olefin, or combinations thereof, which copolymer contains over 85% by weight of propylene;

B) 5–20 parts by weight of a copolymer fraction containing ethylene, insoluble in xylene at ambient temperature;

C) 40–80 parts by weight of a copolymer fraction of ethylene and propylene or another α-olefin, or combinations thereof, and, optionally, minor portions of a diene, said fraction containing less than 40% by weight of ethylene, being soluble in xylene at ambient temperature, and having an intrinsic viscosity from 1.5 to 4 dl/g; the percent by weight of the sum of the (B) and (C) fractions with respect to the total polyolefin composition being of from 50% to 90% and the (B)/(C) weight ratio being lower than 0.4.

5 Claims, No Drawings

ELASTOPLASTIC POLYOLEFIN COMPOSITIONS

The present invention concerns highly flexible elastoplastic polyolefin compositions and the process for their preparation.

It is known that one can obtain polyolefin compositions having elastic properties while maintaining a good thermoplastic behavior (i.e., that can be transformed into finished products with the same techniques used for thermoplastic polymers), by way of sequential copolymerization of propylene, optionally containing minor quantities of olefin comonomers, and then ethylene/propylene or ethylene/α-olefin mixtures.

Catalysts based on halogenated titanium compounds supported on magnesium chloride are used for this purpose.

Given the increasing practical interest for this type of compositions, due, among other things, to the valued properties which are typical of polyolefins (such as chemical inertia, mechanical properties and nontoxicity), there is an increasing effort in the art to extend the use of said compositions to many different fields.

European published patent application 400333 describes elastoplastic polyolefin compositions obtained by sequential polymerization comprising:

A) 10–60 parts by weight of a crystalline polymer or copolymer of propylene;
B) 10–40 parts by weight of a polymer fraction containing ethylene, insoluble in xylene at ambient temperature;
C) 30–60 parts by weight of an ethylene/propylene copolymer fraction, soluble in xylene at ambient temperature.

Said compositions are flexible and have valued elastic properties, as demonstrated by low flexural modulus values (less than 700 MPa, and, typically, higher than 200 MPa) associated to good tension set values, but do not have particularly good optical characteristics (transparency).

It has also been found that good transparency characteristics can be obtained in compositions prepared by sequential polymerization when the content of crystalline polymer produced in the first stage of polymerization is relatively high, to the detriment of elasticity and flexibility properties.

For example published European patent application 373660 describes polypropylene compositions obtained by sequential polymerization, containing (A) from 70 to 98% by weight of a crystalline copolymer of propylene and (B) from 2 to 30% by weight of an elastomeric copolymer of ethylene with propylene and/or another α-olefin whose portion soluble in xylene has an intrinsic viscosity which satisfies a particular correlation with the one of the crystalline copolymer.

These compositions, however, although they have good optical qualities, also have a high flexural modulus (typically higher than 600 MPa), given the high content of crystalline copolymer (A).

Therefore, there is a need for elastoplastic polyolefin compositions which are even more flexible (i.e., they have lower flexural modulus values) than the products already available. It is also desirable that said compositions have good optical qualities.

In fact, flexible polymer materials are used widely for a variety of applications, such as the medical field (for example in the production of containers for plasma or intravenouns solutions, or phleboclysis tubes), as well as for packaging, for calendered materials or to extrusion coat or cover electrical wires and cables.

In many of these applications vinyl chloride polymers containing adequate plasticizers, which are necessary to give said polymers their desired flexibility characteristics, are presently used.

Said polymer products, however, are subject to ever increasing criticism both for the suspected toxicity of the plasticizers they contain and because when incinerated, they can disperse into the atmosphere extremely toxic by-products, such as dioxin.

It would be very useful, therefore, to substitute said materials with products which besides the desired flexibility characteristics and, optionally, transparency, would have the chemical inertia and nontoxicity typical of olefin polymers.

This invention provides a highly flexible elastoplastic polyolefin composition comprising, in parts by weight:

A) 10–50, preferably 10–40 and more preferably 20–35 of homopolymer of propylene with isotactic index greater than 80, preferably from 85 to 98, or of a copolymer of propylene with ethylene, a $CH_2=CHR$ α-olefin where R is a 2–8 carbon alkyl radical or a combination thereof, which copolymer contains over 85%, preferably from 90 to 99% by weight of propylene, and has an isotactic index higher than 80;
B) 5–20, preferably 7–15, of a copolymer fraction containing ethylene, insoluble in xylene at ambient temperature;
C) 40–80, preferably 50–70, of a copolymer fraction of ethylene and (i) propylene or (ii) another $CH_2=CHR$ α-olefin, where R is a 2–8 carbon alkyl radical, or (iii) a combination thereof, optionally, with minor amount of a diene, containing less than 40% by weight, preferably 20–38%, more preferably 25–38% by weight of ethylene, said fraction being also soluble in xylene at ambient temperature, and having an intrinsic viscosity from 1.5 to 4 dl/g, preferably from 1.7 to 3 dl/g;

with a percentage by weight of the sum of the (B) and (C) fractions with respect to the total polyolefin composition from 50% to 90%, preferably from 65% and 80%, and a (B)/(C) weight ratio lower than 0.4, preferably from 0.1 to 0.3.

The total quantity of copolymerized ethylene is preferably from 15% to 35% by weight.

The compositions present at least one melt peak, determined by way of DSC, present at a temperature higher than 120° C., and at least one peak, relative to the vitreous transition, present at temperatures from −10° C. and −35° C.

Said compositions, moreover, have a flexural modulus of less than 150 MPa, generally from 20 and 100 MPa; yield point from 3 to 20 MPa, tensile stress at break, and elongation at break, respectively, from 10 to 20 MPa, and higher than 400%; a tension set, at 75% elongation, from 20% to 50%; Shore D hardness from 20 and 35; moreover, they do not break when an IZOD impact test is conducted at −50° C. Preferably the Haze values are less than 40%.

Copolymers of propylene with ethylene or an α-olefin are or a combination thereof preferred (A) components, because they confer high transparency to the compositions of the invention.

The compositions can be prepared with a polymerization process comprising at least two stages, where in the first stage the relevant monomer(s) are polymerized to form component (A) and in the following stages the mixtures ethylene-propylene, ethylene and another α-olefin, ethylene-propylene- another α-olefin and, optionally, a diene, are polymerized to form components (B) and (C).

The polymerization occur can in liquid phase, gas phase or liquid-gas phase.

For example, it is possible to carry out the propylene polymerization stage using liquid propylene as diluent, and the following copolymerization stage in gas phase, without inermediate stages except for the partial degassing of the propylene.

Propylene polymerization to form component (A) can be done in the presence of ethylene or an α-olefin, such as for example butene-1, pentene-1, 4-methylpentene-1, hexene-1 and octene-1, or combinations thereof in such quantities that the isotactic index of the resulting component (A) is not less than 80%.

As previously said, the copolymerization of propylene and ethylene or another α-olefin or combinations thereof to form components (B) and (C) can occur in the presence of a diene, conjugated or not, such as butadiene, 1,4-hexadiene, 1,5-hexadiene and ethylidene-norbornene-1.

The diene when present, is typically in an amount of from 0.5 to 10% by weight with respect to the weight of (B)+(C).

The reaction temperature in the polymerization stage for the preparation of component (A) and in the one for the preparation of components (B) and (C) can be the same or different, and is usually from 40° C. to 90° C., preferably 50°-80° C. for the preparation of component (A), and 40°-60° C. for the preparation of components (B) and (C).

The pressure of the first stage, if carried out in liquid monomer, is the one which competes with the vapor pressure of the liquid propylene at the operating temperature used, and is possibly modified by the vapor pressure of the small quantity of inert diluent used to feed the catalyst mixture, and the overpressure of optional monomers and the hydrogen used as molecular weight regulator.

The polymerization pressure, if done in liquid phase, indicatively can be from 5 to 30 atm. The residence times relative to the two stages depend on the desired ratio between fraction (A) and (B)+(C), and are usually from 15 min. to 8 hours. As molecular weight regulators one can use the traditional chain transfer agents known in the art, such as hydrogen or $ZnEt_2$.

The catalyst used in the polymerization comprises the product of the reaction of a solid component containing a titanium compound and an electron-donor compound (internal donor) supported on magnesium chloride, with an Al-trialkyl compound and an electron-donor compound (external donor).

In order to obtain the compositions of the invention in flowable spherical particles having high bulk density, it is critical that the solid catalyst component present the following properties:
surface area less than 100 $m^2/g$, preferably from 50 to 80 $m^2/g$.
porosity: from 0.25 to 0.4 cc/g.
X-ray spectrum: Presence of halo at 2 $\theta$ angles from 33.5° and 35°, and absence of reflections at 2 $\theta = 14.95°$.

The catalyst component is prepared with the following methods.

A magnesium chloride adduct with alcohols, containing generally 3 moles alcohol per mole $MgCl_2$, is obtained in spherical particles by emulsifying the adduct, in the molten state, in an inert hydrocarbon liquid immiscible with the adduct, and then cooling the emulsion very quickly in order to cause a solidification of the adduct in spherical particle form.

The particles then undergo a partial dealcoholation by way of a heating cycle at temperatures from 50° and 130° C., which brings the alcohol content from 3 to 1-1.5 moles per mole $MgCl_2$.

The adduct is then suspended in cold $TiCl_4$ (typically at 0° C.), at a concentration of 40-50 g/l, and then brought to 80°-135° C. where it is maintained for 1-2 hours.

An electron-donor compound preferably selected from the alkyl, cycloalkyl or aryl phthalates, such as, for example, diisobutyl, di-n-butyl and di-n-octyl phthalate, is added to the $TiCl_4$.

The excess $TiCl_4$ is separated hot by way of filtration or sedimentation, and the treatment with $TiCl_4$ is repeated one or more times; afterwards, the solid is washed with heptane or hexane and then dried.

The catalyst component thus obtained presents the following characteristics:
surface area less than 100 $m^2/g$, preferably from 50 to 80 $m^2/g$.
porosity from 0.25 to 0.4 cc/g.
a pore volume distribution wherein more than 50% of said pores have a radius greater than 100 Å.
X-ray spectrum: presence of halo with maximum intensity at 2 $\theta$ angles from 33.5° and 35°, and where there is no reflection at 2 $\theta = 14.95°$.

The catalyst is obtained by mixing such catalyst component with an al-trialkyl compound, in particular Al-triethyl and Al-triisobutyl, and an electron-donor compound preferably selected from the silane compounds of the formula $R'R''Si(OR)_2$ where $R'$ and $R''$ are the same or different, and are $C_{1-18}$ alkyl, $C_{3-18}$ cycloalkyl or $C_{6-18}$ aryl radicals, and R is a $C_{1-4}$ alkyl radical.

Representative silanes are diphenyldimethoxysilane, dicyclohexyldimethoxysilane, methyl-tert-butyldimethoxysilane, diisopropyldimethoxysilane, dicyclopentyldimethoxysilane, cyclohexylmethyldimethoxysilane.

Silane compounds such as phenyltriethoxysilane may also be used.

The Al-Ti ratio is generally from 10 to 200 and the silane/Al molar ratio from 1/1 to 1/100.

The catalysts may be precontacted with small quantities of olefin (prepolymerization), maintaining the catalyst in supension in a hydrocarbon solvent, and polymerizing at temperatures from ambient to 60° C., thus producing a quantity of polymer from 0.5 to 3 times the weight of the catalyst.

The operation can also take place in liquid monomer, producing, in this case, a quantity of polymer 1000 times the weight of the catalyst.

By using the above mentioned catalysts the polyolefin compositions are obtained in spheroidal particle form, said particle having an average diameter from about 0.5 to 7 mm.

The products which can be obtained from the polyolefin compositions of the present invention find application particularly in the medical, automotive, packaging and electrical cable covering fields, as well as the calendering material field.

One can also add additives, fillers and pigments commonly used for olefin polymers, such as, for example, nucleating agents, extension oils, mineral fillers, organic and inorganic pigments.

The data reported in the examples and the specification relative to the following properties have been determined according to the methods indicated below.

| Property | Method |
|---|---|
| Melt Flow Note (MFRL.) | ASTM-D 1238 condition L |
| Ethylene % by weight | I.R. Spectroscopy |
| Intrinsic viscosity | Determined in tetrahydro-naphthalene at 135° C. |
| xylene soluble % by weight | (see note below) |
| Flexural modulus at 23° C. and vitreous transition temperature (Tg) | Determined by way of a device for dynamic-mechanical measurements DMTA of Polymer Laboratories under the following conditions: frequency measure: 1 Hz; scanning temperature: 2° C./min. The polymer sample to be analyzed is made up of a 40 × 10 × 2 mm plaque taken from a sheet obtained by pressure molding with Carver press at 200° C., 10 tons (of pressure) for 10 minutes, and cooling at 15° C./min. |
| Notched IZOD impact | ASTM - D 256 |
| Haze | ASTM - D 1003 |
| Shore Hardness D | ASTM - D 2240 |
| Tension set at 75% | ASTM - D 412 |
| Tensile strength at break and at yield | ASTM - D 638 |
| Surface area | B.E.T. |
| Porosity | B.E.T. |
| Bulk density | DIN - 53194 |

Unless otherwise specified, the samples to be subjected to the various physical-mechanical analyses were molded by use of a Negri & Bossi injection press 90, after stabilizing the sample with IRGANOX 1010 hindered phenolic stabilizer (0.1% by weight), and BHT (2,6 di-tert-butyl-p-cresol) (0.1% by weight), and pelletizing the sample with a single screw Bandera extruder (cylinder diameter 30 mm) at 210° C. The conditions were as follows:

temperature of the melt 250° C.;
temperature of the mold 60° C.;
injection time 20 sec;
cooling time 25 sec.

The samples to be subjected to the haze analysis were molded by way of a GBF G 235/90 injection press under the following conditions:

temperature of the melt 260° C.;
temperature of the mold 40° C.;
injection time 20 sec.;
cooling time 10 sec.

The dimensions of the samples for the haze test are 75×75×1 mm.

The weight percentage of the sum of the (B) and (C) fractions, indicated with % (B+C), is calculated by determining the weight of the mixture fed during the second stage and comparing it with the weight of the final product.

The weight percentage (%) of the (A), (B) and (C) fractions described in the text are determined in the following manner:

% (A) = 100 − % (B+C)

% (C) = $S_F - P_A S_A$ where $S_F$ and $S_A$ are the percentage by weight of the portion soluble in xylene of the final product and of the fraction (A), respectively; $P_A$ is the weight ratio between said fraction (A) and the final product.

% (B) = 100 − %(A) − %(C)

The percentage by weight of ethylene contained in copolymer fraction (C) which is soluble in xylene is calculated using the following formula:

$$\% \text{ wt ethylene in fraction (C)} = \frac{C_F - C_A \cdot X}{1 - X}$$

where:

$C_F$ = % ethylene in the soluble in xylene of the final product;

$C_A$ = % ethylene in the soluble in xylene of the franction (A);

$X = S_A \cdot P_A / S_F$

The intrinsic viscosity of fraction (C) (I.V._c) has been calculated using the following formula:

$$(I.V._c) = (I.V._{SF} - I.V._A \cdot X)/(1 - X)$$

where:

I.V._SF is the intrinsic viscosity of the fraction soluble in xylene of the final composition;

I.V._A is the intrinsic viscosity of the soluble in xylene of fraction (A).

Note

DETERMINING THE PERCENTAGE OF SOLUBLE IN XYLENE 2.5 g of polymer are dissolved in 250 ml of xylene at 135° C. under agitation. After 20 minutes the solution is cooled to 25° C., with agitation, and then it is allowed to settle for 30 minutes.

The precipitate is filtered with filter paper; the solution is evaporated under a nitrogen current, and the residue dried under vacuum at 80° C. until reaches constant weight. The weight percentage of polymer soluble in xylene at ambient temperature is then calculated. The percent by weight of polymer insoluble in xylene at ambient temperature is considered the isotactic index of the polymer. This value corresponds substantially to the isotactic index determined by extraction with boiling n-heptane, which by definition constitutes the isotactic index of polypropylene.

EXAMPLES

GENERAL OPERATING CONDITIONS

The tests are done in a 22 liter stainless steel autoclave equipped with a helicoid magnetic agitator, operating at about 90 rpm.

The gas phase is analyzed continuously with a process gas chromatograph in order to determine the content of ethylene, propylene and hydrogen. During polymerization, ethylene, propylene and hydrogen are fed in such a way that their concentration in gas phase is maintained constant.

The operation is discontinuous in two stages: the first stage is the polymerization of propylene with ethylene in liquid monomer and the second the copolymerization of ethylene and propylene in gas phase.

a) 1st stage

In the autoclave at 20° C. are introduced, in order: 16 liters of liquid propylene, appropriate quantities of ethylene and hydrogen, as set forth in Table 1A, and the catalyst complex, consisting of a solid component (about 0.15 g) prepared as described below, and a mixture of 75 ml of Al-triethyl (TEAL) a 10% concentration in hexane and an appropriate quantity of cyclohexylmethyldimethoxysilane (CMMS) donor, so that the (Al/CMMS molar ratio=7.5). The catalyst system is fed into the autoclave with propylene pressure. The temperature is brought to 70° C. in about 10 minutes and maintained constant throughout the entire polymerization process.

After a predetermined time period, essentially all the unreacted monomer(s) are eliminated by way of degassing at 60° C. at atmospheric pressure.

B) 2nd stage

After a sample is removed in order to carry out the various analyses, the polymer of the first stage is brought to a temperature that has been predetermined. Then are fed, in order, propylene and ethylene at the ratio and in the quantity desired for achieve the composition of the gas phase and the preestablished pressure.

During polymerization, the pressure and gas phase composition are maintained constant by feeding an ethylene-propylene mixture with the same composition of the desired copolymer, by way of instruments which regulate and/or measure the flow rate. The length of the feed depends on the reactivity of the catalyst system and the quantity of copolymer to be produced.

At the end of the polymerization, the particulate polymer is discharged, stabilized as set forth herein above and dried in an oven under nitrogen current at 60° C. The catalyst component used is made from a $M_gCl_2 \cdot 3\ C_2H_5OH$ adduct prepared as follows:

28.4 g of anhydrous $MgCl_2$, 49.5 g of pure anhydrous ethanol, 100 ml of ROL OB/30 vaseline oil and 100 ml of silicone oil (350 cs viscosity) are introduced in a flask immersed in a bath thermoregulated, at 120° C. under agitation, in an inert atmosphere, until the $MgCl_2$ is completely dissolved. The mixture is then transferred hot, always under an inert atmosphere, in a 150 ml container equipped with a heating jacket, and containing 150 ml of vaseline oil and 150 ml of silicone oil. The mixture is maintained at 120° C. and under agitation, the latter being carried out with a Hanke & Kunkel K.G. Ika Werke Ultra Turrax T-45 N agitator. Said agitation continues for 3 minutes at 3000 rpm. The mixture is discharged into a 2 liter vessel containing 1000 ml of anhydrous n-heptane stirred and cooled so that the final temperature does not exceed 0° C. The $MgCl_2 \cdot 3EtOH$ microspheres thus obtained are filtered and dried under vacuum at ambient temperature. The dried adduct obtained in this manner is then dealcoholated by heating it at temperatures which increase gradually from 50° C. to 100° C. under nitrogen current until the alcohol content is 1.5 moles per mole $MgCl_2$.

The partially dealcoholated adduct has a surface area=9.1 $m^2/g$ and bulk density=0.564 g/cc.

25 g of said adduct are added, under agitation at 0° C., to 625 ml of $TiCl_4$. The mixture is then heated to 100° C. in 1 hour. When the temperature reaches 40° C., diisobutylphthalate is added in an amount such that the Mg/diisobutylphthalate molar ratio=8. The resulting mixture is heated at 100° C. for 2 more hours, then allowed to settle, and the liquid is syphoned off hot. 550 ml of $TiCl_4$ are added and the mixture is heated at 120° C. for 1 hour.

It is allowed to settle and the liquid is siphoned off hot. The solid is washed 6 times using 200 ml of anhydrous hexane at 60° C., and three more times using 200 ml of anhydrous hexane at ambient temperature.

After drying under vacuum, the solid presents the following characteristics:

porosity=0.261 cc/g;
surface area=66.5 $m^2/g$;
bulk density=0.55 g/cc.

All the analyses performed and relative operating conditions are shown in Tables 1A and 1B.

Other features, advantages and embodiments of the invention disclosed herein will be readily apparent to those exercising ordinary skill after reading the foregoing disclosure. In this regard, while specific embodiments of the invention have been described in considerable detail, variations and modifications of these embodiments can be effected without departing from the spirit and scope of the invention as described and claimed.

TABLE 1A

|  |  | Examples | | | | |
| --- | --- | --- | --- | --- | --- | --- |
|  |  | 1 | 2 | 3 | 4 | 5 |
| 1st PHASE |  |  |  |  |  |  |
| Temperature | °C. | 70 | 70 | 70 | 70 | 70 |
| Pressure | atm | 31 | 31 | 31 | 31 | 31 |
| Time | min | 30 | 20 | 30 | 30 | 30 |
| $H_2$ in gas phase | % mol | 0.58 | 0.10 | 0.30 | 0.49 | 0.22 |
| Ethylene in gas phase | % mol | 1.45 | 2.60 | 2.50 | 1.96 | 1.70 |
| Ethylene in pol. | % wt | 3.0 | 4.3 | 4.1 | 3.8 | 3.9 |
| Intr. Visc. | dl/g | 2.18 | 3.09 | 2.31 | 2.54 | 2.72 |
| Sol. Xyl. ($S_A$) | % wt | 9.4 | 9.0 | 10.7 | 11.0 | 12.5 |
| Ethylene in Sol. Xyl. ($C_A$) | % wt | 11 | 16 | 17 | 22 | 20 |
| Intr. Visc. Sol. Xyl. (I.V.$_A$) | dl/g | 1.15 | 1.39 | 1.19 | 1.28 | 1.32 |
| 2nd PHASE |  |  |  |  |  |  |
| Temperature | °C. | 50 | 50 | 50 | 50 | 50 |
| Pressure | atm | 11.3 | 11.5 | 11.3 | 11.3 | 11.3 |
| Time | min | 335 | 500 | 250 | 250 | 260 |
| $H_2$ in gas phase | % mol | 2.23 | 3.0 | 2.05 | 2.2 | 2.1 |
| Ethylene in gas phase | % mol | 15.9 | 16.9 | 22.54 | 18.65 | 18.9 |

TABLE 1B

|  |  | EXAMPLES | | | | |
| --- | --- | --- | --- | --- | --- | --- |
| FINAL PRODUCT |  | 1 | 2 | 3 | 4 | 5 |
| Yield | Kg Pol/g Cat | 11 | 16.3 | 9.9 | 8.0 | 9.1 |
| Comonomer | % wt | 24.6 | 22.7 | 29.0 | 22.6 | 25.5 |
| Bipolymer (B + C) | % wt | 70 | 67 | 7.18 | 57 | 66 |
| Intr. Visc. | dl/g | 2.05 | 2.3 | 2.34 | 2.42 | 2.4 |
| Sol. in Xyl. ($S_F$) | % wt | 63.4 | 60.5 | 63.5 | 51.3 | 60.5 |
| Ethylene sol. Xyl. ($C_F$) | % wt | 30.2 | 27.0 | 34.8 | 31.2 | 31.4 |
| In. Vis. sol. Xyl. I.V.$_{SF}$ | dl/g | 1.83 | 2.02 | 2.12 | 1.83 | 1.98 |
| Fraction B | % wt | 9.45 | 9.37 | 11.34 | 10.4 | 9.75 |
| Fraction C | % wt | 60.55 | 57.63 | 60.46 | 46.6 | 56.15 |
| Ethylene | % wt | 51.9 | 57.1 | 53.7 | 52.9 | 59.8 |

TABLE 1B-continued

| FINAL PRODUCT | | EXAMPLES | | | | |
|---|---|---|---|---|---|---|
| | | 1 | 2 | 3 | 4 | 5 |
| frac. (B) | | | | | | |
| Ethylene frac. (C) | % wt | 31.1 | 27.6 | 35.7 | 32.1 | 32.3 |
| In. Vis. frac. (C) (I.V.$^C$) | dl/g | 1.86 | 2.05 | 2.18 | 1.89 | 2.03 |
| Melting point | °C. | 150 | 147 | 145 | 144 | 144 |
| Flexural modulus | MPa | 30 | 77 | 82 | 106 | 120 |
| Notched IZOD at −50° C. | J/m | DB | DB | DB | DB | DB |
| Shore D hardness | | 24 | 25 | 20 | 29 | 24 |
| Tension Set at 75% | % | 41 | 28 | 36 | 45 | 38 |
| Tensile stress | MPa | 13.8 | 15.8 | 15.4 | 17.3 | 16.4 |
| Tens. str. at yield | MPa | 5.0 | 5.8 | 4.6 | 15.5 | 6.1 |
| Elongation at break | % | 517 | 925 | 940 | 410 | 892 |
| Haze | % | 31 | 34 | 35 | 36 | 36 |
| Vitreous trans. 1) | | −25 (P) −75 −128 | −23 (P) −119 | −28 (P) −81 −121 | −31 (P) −2 −125 | n.d. |

1) (P) = main peak
DB = does not break

We claim:

1. A polyolefin composition prepared by sequential polymerization in at least two stages comprising:

(A) 10-50 parts by weight of a homopolymer of propylene with isotactic index greater than 80, or a copolymer of propylene with ethylene, a CH$_2$=CHR α-olefin where R is a 2-8 carbon alkyl radical or combinations thereof, which copolymer contains over 85% by weight of propylene and having an isotactic index greater than 80;

(B) 5-20 parts by weight of a copolymer fraction of ethylene and propylene or another CH$_2$=CHR α-olefin, where R is a 2-8 carbon alkyl radical, or combinations thereof, containing greater than about 51% by weight ethylene, insoluble in xylene at ambient temperature;

(C) 40-80 parts by weight of a copolymer fraction of ethylene and propylene or another CH$_2$=CHR α-olefin, where R is a 2-8 carbon alkyl radical, or combinations thereof, and optionally, minor portions of a diene, said fraction containing from 20 to less than 40% by weight of ethylene, being soluble in xylene at ambient temperature, and having an intrinsic viscosity from 1.5 to 4 dl/g; wherein the percent by weight of the sum of the (B) and (C) fractions with respect to the total polyolefin composition being from 50% to 90% and the (B)/(C) weight ratio being lower than 0.4, and said composition having a flexural modulus of less than 150 MPa, a tensile stress at break of from 10 to 20 Mpa, an elongation at break of higher than 400%, a tension set at 75% of from 20% to 50% and a haze of less than 40%.

2. The polyolefin composition of claim 1, wherein the composition is in spheroidal particle form having an average diameter from 0.5 to 7 mm.

3. The polyolefin composition of claim 1, wherein the total content of copolymerized ethylene is from 15% to 35% by weight.

4. The polyolefin composition of claim 1, wherein the flexural modulus is less than 20 to 100 MPa, tension set at 75% is from 20% to 40%, and haze is less than 40%.

5. An injection molded article comprising the polyolefin composition of claim 1.

* * * * *

UNITED STATES PATENT AND TRADEMARK OFFICE
CERTIFICATE OF CORRECTION

PATENT NO. : 5,286,564

DATED : February 15, 1994

INVENTOR(S) : Giuliano Cecchin et al

It is certified that error appears in the above-identified patent and that said Letters Patent is hereby corrected as shown below:

At col. 8, line 59, in Table 1B, "7.18" should be --71.8--.

At col. 9, line 14, in Table 1B-continued, row of numbers should be moved one column to the right.

Signed and Sealed this

Twenty-eighth Day of June, 1994

Attest:

BRUCE LEHMAN

*Attesting Officer*  *Commissioner of Patents and Trademarks*